US009441947B2

(12) United States Patent
Kapit et al.

(10) Patent No.: US 9,441,947 B2
(45) Date of Patent: Sep. 13, 2016

(54) N-WAVELENGTH INTERROGATION SYSTEM AND METHOD FOR MULTIPLE WAVELENGTH INTERFEROMETERS

(71) Applicant: Woods Hole Oceanographic Institution, Woods Hole, MA (US)

(72) Inventors: Jason A. Kapit, Pocasset, MA (US); Norman E. Farr, Woods Hole, MA (US); Raymond W. Schmitt, Falmouth, MA (US)

(73) Assignee: Woods Hole Oceanographic Institution, Woods Hole, MA (US)

(*) Notice: Subject to any disclaimer, the term of this patent is extended or adjusted under 35 U.S.C. 154(b) by 75 days.

(21) Appl. No.: 14/166,650

(22) Filed: Jan. 28, 2014

(65) Prior Publication Data

US 2014/0293286 A1    Oct. 2, 2014

Related U.S. Application Data

(60) Provisional application No. 61/757,465, filed on Jan. 28, 2013.

(51) Int. Cl.
*G01J 3/45* (2006.01)
*G01B 9/02* (2006.01)
*G01D 5/26* (2006.01)

(52) U.S. Cl.
CPC ......... *G01B 9/02041* (2013.01); *G01B 9/0209* (2013.01); *G01B 9/02044* (2013.01); *G01D 5/266* (2013.01)

(58) Field of Classification Search
CPC .................................... G01J 9/02; G01J 3/00
USPC .................................................. 356/451, 454
See application file for complete search history.

(56) References Cited

U.S. PATENT DOCUMENTS

| 7,564,562 | B2* | 7/2009 | Choi ............................. 356/454 |
| 2005/0151975 | A1* | 7/2005 | Melnyk ......................... 356/480 |
| 2009/0219542 | A1* | 9/2009 | Waegli et al. ................ 356/451 |

OTHER PUBLICATIONS

Debnath, S. K., et al. (2006) "Improved Optical Profiling Using the Spectral Phase In Spectrally Resolved White-Light Interferometry," Applied Optics, vol. 45, No. 27, pp. 6965-6972.
Calatroni J., et al. (1996) "Spectrally-resolved white-light interferometry as a profilometry tool," Optics and Laser Technolgy, vol. 28, No. 7, pp. 485-489.
Hart, M., et al. (1998) "Fast Surface Profiling By Spectral Analysis Of White-Light Interferograms With Fourier Transform Spectroscopy," Applied Optics, vol. 37, No. 10, pp. 1764-1769.

(Continued)

*Primary Examiner* — Jonathan Hansen
(74) *Attorney, Agent, or Firm* — Goodwin Procter LLP

(57) ABSTRACT

In an interrogation system for multiple wavelength interferometers a fringe spectrum that includes non-quadrature-spaced radiation-intensity samples is analyzed to obtain a high resolution relative phase measurement of the optical path-length difference associated with the fringe spectrum. The fringe spectrum can be analyzed to obtain a fringe number and a quadrant as well, which can be combined with the relative phase measurement to obtain a high precision measurement of the absolute optical path-length difference. An environmental condition corresponding to the absolute optical path-length difference can be measured using the measurement of the absolute optical path-length difference.

21 Claims, 8 Drawing Sheets

(56) References Cited

OTHER PUBLICATIONS

International Search Report and Written Opinion for International Patent Application No. PCT/US2014/013430, dated May 30, 2014, 10 pages.
Zhu, P., et al. (2012) "Single-shot two-dimensional surface measurement based on spectrally resolved white-light interferometry," Applied Optics, vol. 51, No. 21, pp. 4971-4975.
Breen, S., et al. (1990) "Fiber optic displacement sensor with subangstrom resolution," Dalhousie University, Applied Optics, vol. 29, No. 1, pp. 1-18.
Calatroni, J., et al. (1996) "Spectrally-resolved white-light interferometry as a profilometry tool," Optics & Laser Technolgy, vol. 28, No. 7, pp. 485-489.
Chang, C., et al. (1996) "Multiplexed Optical Fiber Sensors Using a Single Fabry-Perot Resonator for Phase Modulation," Journal of Lightwave Technology, vol. 14, No. 7, pp. 1653-1663.
Cortes, R., et al. (1998) "Interferometric fiber-optic temperature sensor with spiral polarizatoin couplers," Optics Communications, vol. 154, pp. 268-272.
Duan, D., et al. (2011) "In-Fiber Fabry-Perot and Mach-SZehnder interferometers based on hollow optical fiber fabricated by arc fusion splicing with small lateral offsets," Optics Communications, vol. 284, pp. 5311-5314.
Egorov, S., et al. (1995) "Spectral Signal Processing in Intrinsic Interferometric Sensors Based on Birefringent Polaraization-Maintaining Optical Fibers," Journal of Lightwave Technology, Vo. 13, No. 7, pp. 1231-1236.
Ezbiri, A., et al. (1997) "Five wavelength interrogation technique for miniature fibre optic Fabry-Perot sensors," Optic Communications, vol. 133, pp. 62-66.
Gangopadhyay, T. K. (2004) "Non-contact vibration measurement based on an extrinsic Fabry-Perot interferometer implemented using arrays of single-mode fibres," Measurement Science and Technology, vol. 15, pp. 911-917.
Hart, M., et al. (1998) "Fast surface profiling by spectral analysis of white-light interferograms with Fourier transform spectroscopy," vol. 37, No. 10, pp. 1764-1769.
Hoang, T., et al. (2011) "Phase extraction from optical interferograms in presence of intensity nonlinearity and arbitrary phase shifts," Applied Physics Letters, vol. 99, (4 pages).
Jackson, D., et al. (1982) "Pseudoheterodyne Detection Scheme For Optical Interferometers," Electronic Letters, vol. 18, No. 25, pp. 1081-1083.
Liu, T., et al. (2000) "A frequency division multiplexed low-finesse fiber optic Fabry-Perot sensor system for strain and displacement measurements," Review of Scientific Instruments, vol. 71, No. 3, pp. 1275-1278.
Lo, Y., et al. (2001) "Differential optical fiber refractometer based on a path-matching differential interferometer with temperature compensation," Applied Optics, vol. 40, No. 21, pp. 3518-3524.
Murphey, K., et al. (1991) "Quadrature phase-shifted, extrinsic Fabry-Perot optical fiber sensors," Optics Letters, vol. 16, No. 4, pp. 273-275.
Qi, B., et al. (2003) "Novel data processing techniques for dispersive white light interferometer," Optical Engineering, vol. 42, No. 11, pp. 3165-3171.
Rao, Y. (2006) "Demodulation algorithm for spatial-frequency-division-multiplexed fiber-optic Fizeau strain sensor networks," Optics Letters, vol. 31, No. 6, pp. 700-702.
Rao, Y. (2006) "Recent progress in fiber-optic extrinsic Fabry-Perot interferometric sensors," Optic Fiber Technology, vol. 12, pp. 227-237.
Rao, Y., et al. (1993) "Design study of fibre-optic based Fabry-Perot type interferometric sensors using low-coherence signal recovery," Fibre Optic and Laser Sensors, vol. 2070, pp. 360-371.
Rao, Y., et al. (1996) "Recent progress in fibre optic low-coherence interferometry," Measurement Science Technology, vol. 7, pp. 981-999.
Rao, Y., et al. (2008) "In-line fiber Fabry-Perot refractive-index tip sensor based on endlessly photonic crystal fiber," Senors and Actuators A, vol. 148, pp. 33-38.
Rugar, H. J., et al. (1989) "Imporved fiber-optic interferometer for atomic force microscopy," Appl. Phys. Lett., vol. 55, No. 25, pp. 2589-2590.
Santos, J.L., et al. (1991) "Passive demodulation of minature fiber-optic-based interferometric sensors using a time-multiplexing technique," Optics Letters, vol. 16, No. 15, pp. 1210-1212.
Schmidt, M., et al. (1999) "Fiber-optic extrinsic Fabry-Perot interferometer sensors with three-wavelength digital phase demodulation," Optics Letters, vol. 24, No. 9, pp. 599-601.
Schmidt, M., et al. (2001) "Fiber-Optic Extrinsic Fabry-Perot Interferometer Strain Sensor with < 50 pm displacement resolution using three-wavelength digital phase demodulation," Optics Express, vol. 8, No. 8, pp. 475-480.
Schmitt, J. (1999) "Optical Coherence Tomography (OCT): A Review," IEEE, vol. 5, No. 4, pp. 1205-1215.
Sirkis, J., et al. (1995) "In-Line Fiber Etalon (ILFE) Fiber-Optic Strain Sensors," Journal of Lightwave Technology, vol. 13, No. 7, pp. 1256-1263.
Smith, D. T., et al. (2009) "A fiber-optic interferometer with subpicometer resolution for dc and low-frequency displacement measurement," Review of Scientific Instruments, vol. 80, pp. 1-8.
Tapia-Mercado, J., et al. (2001) "Precision and Sensitivity Optimization for White-Light Interferometric Fiber-Optic Sensors," Journal of Lightwave Technology, vol. 19, No. 1, pp. 70-74.
Tatsuno, K., et al. (1987) "Diode laser direct modulation heterodyne interferometer," Applied Optics, vol. 26, No. 1, pp. 37-40.
Urbanczyk, W., et al. (2001) "Digital demodulation system for low-coherence interferometric sensors based on highly birefringent fibers," Applied Optics, vol. 40, No. 36, pp. 6618-6625.
Velosa, E., et al. (2012) "Digital Control of a White Light Interrogtation System for Optical Fiber Interferometers," IEEE, vol. 12, No. 1, pp. 201-206.
Wang, A., et al. (2001) "Self-Calibrated Interferometric-Intensity-Based Optical Fiber Sensors," Journal of Lightwave Technology, vol. 19, No. 10, pp. 1495-1501.
Wang, T., et al. (1998) "A high precision displacement sensor using a low-finesse fiber-optic Fabry-Perot interferometer," Sensors and Actuators, vol. 69, pp. 134-138.
Wang, Z., et al. (2004) "Advanced iterative algorithm for phase extraction of randomly phase-shifted interferograms," Optics Letters, vol. 29, No. 14, pp. 1671-1673.
Webb, et al. (1988) "Extended-Range Interferometry Using A Coherence-Tuned, Synthesised Dual-Wavelength Technique With Multimode Fibre Links," Electronic Letters, vol. 24, No. 18, pp. 1173-1175.
Xu, J., et al. (2010) "Phase-shift extraction for phase-shifting interferometry by histogram of phase difference," Optics Express, Vo. 18, No. 23, pp. 24368-24378.
Yu, B., et al. (2006) "Analysis of Fiber Fabry-Perot Interferometric Sensors Using Low-Coherence Light Sources," Journal of Lightwave Technology, vol. 24, No. 4, pp. 1758-1767.
Yuan, L., (1997) "White-light interferometric fiber-optic strain sensor from three-peak-wavelength broadband LED source," Applied Optics, vol. 36, No. 25, pp. 6246-6250.
Zhang, G., et al. (2004) "An investigation of interference/intensity demodulated fiber-optic Fabry-Perot cavity sensor," Sensors and Actuators, vol. 116, pp. 33-38.
Zhang, Y, et al. (2010) "Fringe Visibility Enhanced Extrinsic Fabry-Perot Interferometer Using a Graded Index Fiber Collimator," vol. 2, No. 3, IEEE Photonics Journal, pp. 468-481.

\* cited by examiner

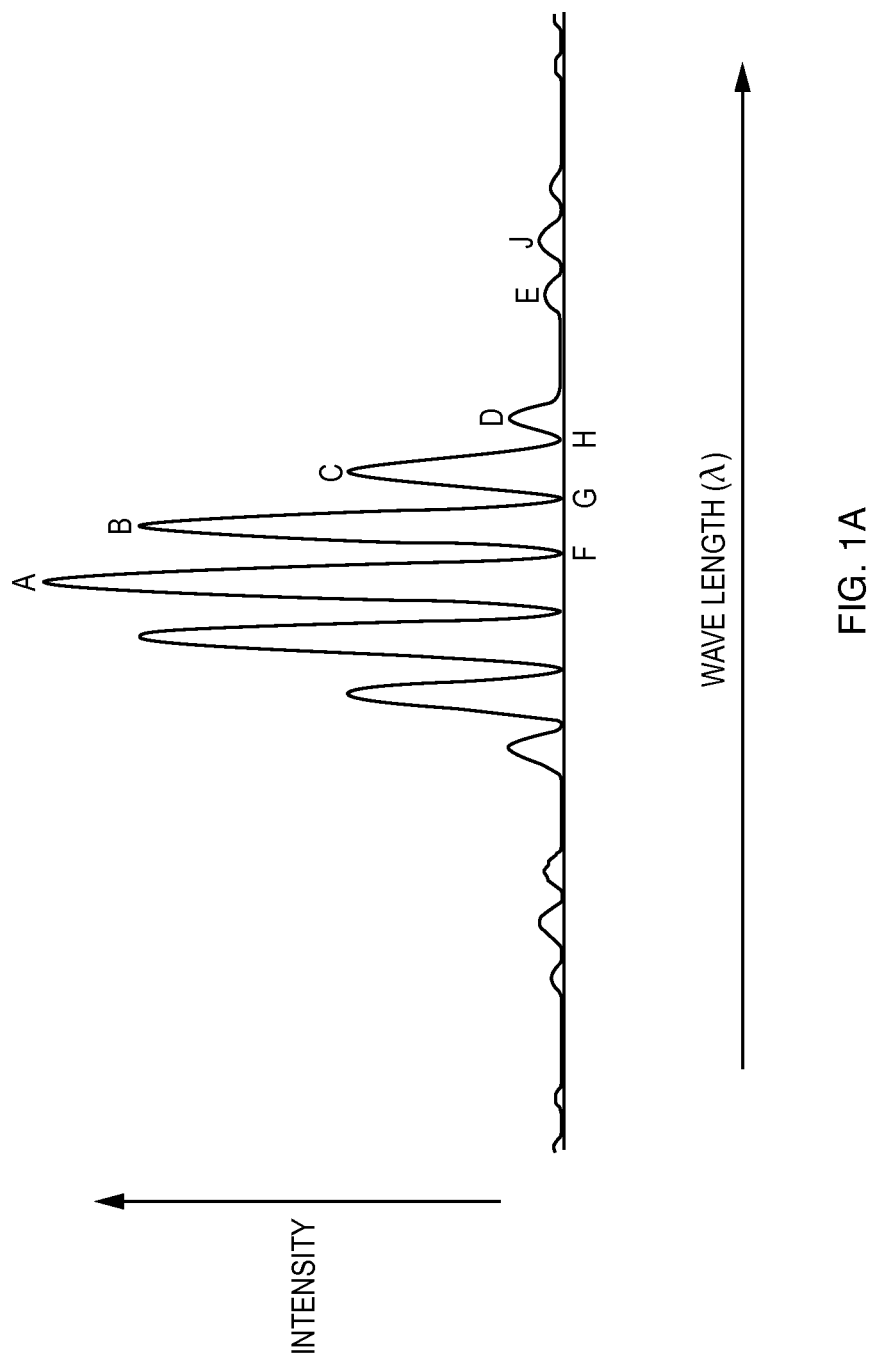

N-WAVELENGTH INTERROGATION SYSTEM AND METHOD FOR MULTIPLE WAVELENGTH INTERFEROMETERS

CROSS-REFERENCE TO RELATED APPLICATIONS

This application is related to and claims the benefit of priority to U.S. Provisional Application Ser. No. 61/757,465, entitled "N-Wavelength Interrogation System for Low Coherence Interferometers," filed on Jan. 28, 2013, the entirety of which is hereby incorporated by reference.

FIELD OF THE INVENTION

The present invention generally relates to interferometric measurements, and in particular to high resolution relative phase and absolute path length difference measurements for interferometric applications enabling improved combinations of resolution and range, which can be used for the determination of pressure, distance, and other physical and chemical parameters.

BACKGROUND

Interferometry makes use of superposition of electromagnetic waves with substantially the same frequency, to produce an interference pattern. Specifics of the interference pattern are due to the phase difference between the waves. Waves that are in phase undergo constructive interference while waves that are out of phase undergo destructive interference.

Typical interferometry methods, such as the well-known Michelson configuration, split a single incoming beam of coherent light into two substantially identical beams using a beam splitter such as a partially reflecting mirror. Each of the resultant beams is made to travel a different route, called a path. The two beams are then recombined at a detector. The difference in the path lengths traveled by each beam before reaching the detector creates a phase difference between beams, which can produce an interference pattern from the recombined beams. In general, any environmental condition encountered in the path of either or both beam(s) that alters the phase of the beam(s) (e.g. a change in the index of refraction of the path) prior to reaching the detector can produce an interference pattern and may impact the details thereof. Therefore, specific properties of the interference pattern can be assessed as indicators of any changes occurring along the path(s).

Very often, interference is detected using a spectrometer that separates wavelengths of light to produce a fringe pattern. Fringes are conventionally described as the light and dark bands produced by the interference of light. The regions of higher intensity (brighter bands) are generally caused by constructive superposition of the beams and the lower intensity (darker bands) regions are generally caused by destructive superposition. In the context of a graphical representation of intensity vs. wavelength (as depicted in FIG. 1A, for example) a fringe spectrum includes one or more fringe cycles. A fringe cycle can be described as a portion of the spectrum or corresponding waveform from one point of local maximum intensity e.g. the point "A" to the adjacent point of maximum intensity, e.g. point "B." The distance between these two points represents a full period of the fringe cycle. In general, a portion of the waveform corresponding to a fringe spectrum location between any two points on the waveform that are separated by one period and the intensity measurements corresponding to that waveform represent a full fringe cycle.

Interferometers generally measure an optical path length which is the product of physical distance and refractive index. As such, interferometers can be used to sense changes in either the physical distance or the refractive index. The term optical path length typically encompasses both refractive index and distance though, typically, only one may be varied and/or measured.

As described above, an absolute difference in light paths can generate an interference pattern also called a fringe pattern. As the absolute optical path difference changes, the fringe pattern also changes. The change in the fringe pattern can be periodic, i.e., the pattern repeats when the absolute path difference changes by one wavelength (e.g., by $\lambda_0$, which can be any one of the N wavelengths in the spectrum—e.g., the smallest, median, or the largest wavelength. A periodically changing fringe pattern can be called a fringe sequence.

Though the fringe pattern repeats, some associated parameter (e.g., fringe spacing) typically changes in a measurable way so that a fringe number m can be determined. The fringe spacing can be the spacing between adjacent peaks in the fringe spectrum. Techniques such as Fourier transform or linear fit can be used to compute an absolute path length difference and a corresponding fringe number and quadrant q. The absolute optical path length difference is approximately equal to $(m+q)\lambda_0$, where m is an integer and q is equal to 0, ¼, ½ or ¾.

Absolute measurement (frequency domain) techniques generally uses a spectrometer as the detector, and can be used to determine m and q described above. These techniques can provide a coarse estimate of the absolute optical path length difference, but the resolution to these techniques is low—typically no better than $\lambda_0/100$. Low-resolution relative-phase techniques can be used as refinements to improve the resolution to as good as $\lambda_0/1000$. In these techniques, wavelength shifts of the spectral peaks are typically monitored and used to estimate path difference relative to a fringe. The resolution of these combined techniques, however, is still not as good as that of the highest-resolution relative-phase techniques, which may have resolution as high as $\lambda_0/100,000$.

High-resolution relative-phase techniques generally use three or more points/samples in a fringe spectrum. Traditionally in these techniques, these points/samples must be located in quadrature. Using these quadrature-spaced points, a high resolution relative measurement of the optical path difference, i.e., measurement of the optical path difference relative to a certain fringe, can be obtained. In other words, this technique can precisely determine $\phi$ such that the absolute optical path-length difference is approximately equal to $(m+q+\phi/2\pi)\lambda_0$. But, alone, this technique does not determine m and q and, as such, does not provide information on absolute path length difference.

The high resolution relative phase technique discussed above also cannot be combined with the absolute measurement techniques, because the high resolution relative phase technique requires approximately quadrature-spaced points from the fringe spectrum. Absolute path length measurement techniques, however, often uses a spectrometer as the detector, which does not reliably provide approximately quadrature-spaced points. Instead, a spectrometer generally provides a fringe spectrum that includes only non-quadrature spaced samples/points. To obtain the quadrature-spaced points, high resolution relative phase techniques typically employ some device other than a spectrometer, but then, absolute path length information cannot be readily obtained.

In addition, these other devices are generally expensive and complex, which can significantly increase the cost and/or complexity of obtaining absolute optical path-length difference measurements. Therefore, an improved system and method is needed to facilitate accurate high resolution absolute optical path-length difference measurements in an efficient manner.

BRIEF DESCRIPTION OF THE DRAWINGS

Various embodiments of the present invention taught herein are illustrated by way of example, and not by way of limitation, in the figures of the accompanying drawings, in which:

FIG. 1A schematically depicts a fringe spectrum;

SUMMARY

Figure 1B:
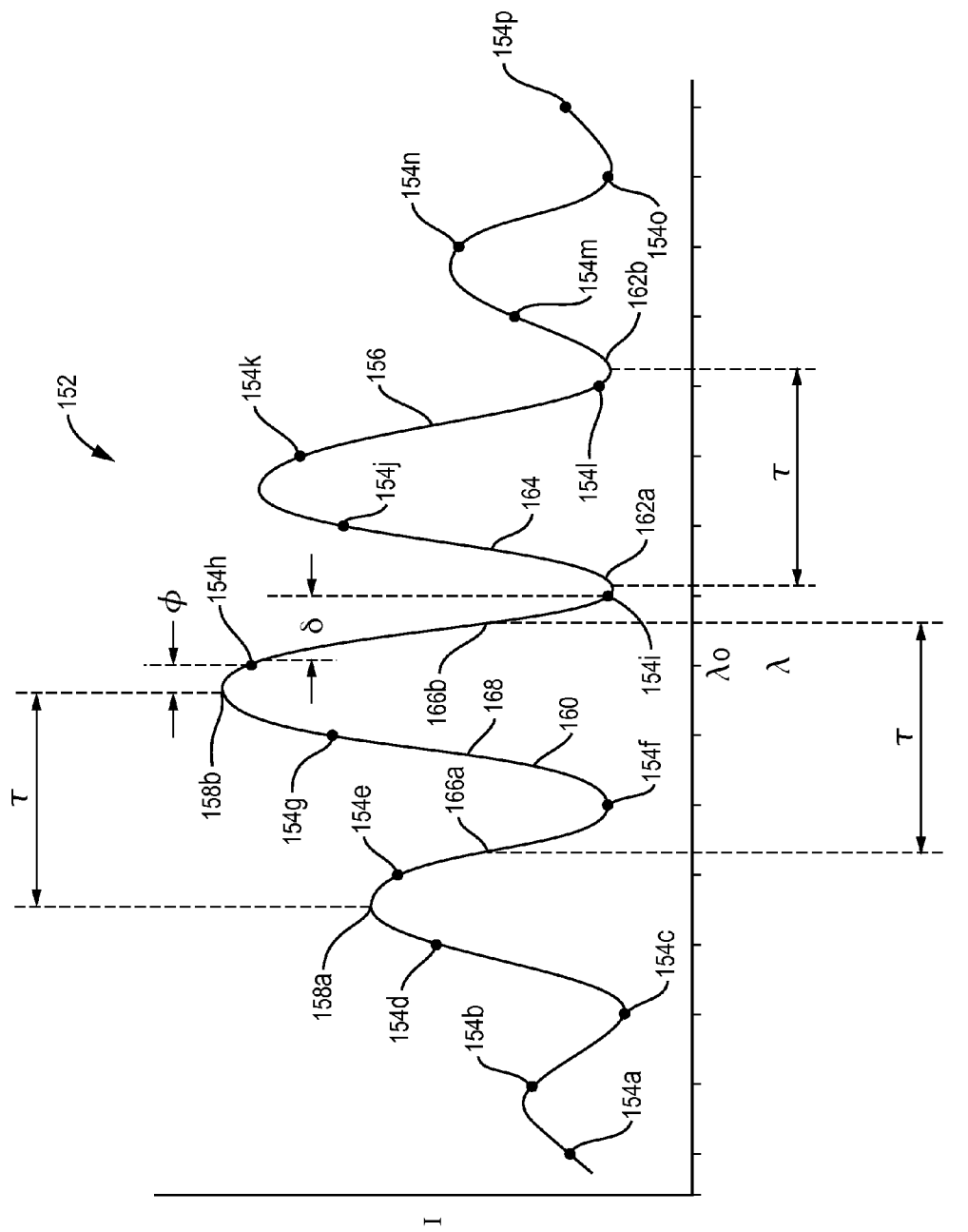
FIG. 1B depicts an exemplary fringe spectrum including non-quadrature-spaced samples.

Various embodiments described herein facilitate an efficient, high resolution absolute optical path length difference measurement. Specifically, the method applies novel analyses methods to interference patterns obtained from superimposed (combined) electromagnetic beams to precisely measure the absolute optical path length difference between the distance traveled by each beam from the point of beam splitting to the point of beam superposition. This is achieved, at least in part, by monitoring (also called interrogating) the intensity of the recombined beam at several specific wavelengths to obtain a fringe spectrum that includes one or more fringe cycles. When obtained using a conventional spectrometer, the fringe spectrum typically includes non-quadrature-spaced samples, as described below. Various properties of the fringe spectrum may be used to obtain a rough estimate of the absolute optical path-length difference. A relative-phase measurement technique that can analyze non-quadrature spaced intensity samples is used to analyze the same spectrum so as to determine a relative phase, i.e., a difference in the optical path lengths of the two beams relative to a fringe cycle, with high resolution.

Unlike other systems, the high resolution relative phase measurement is obtained from non-quadrature-spaced samples in the same spectrum that can be used to obtain a rough absolute estimate as well. Therefore, the rough estimate and the high-resolution relative phase measurement can be aggregated to provide a high resolution absolute optical path-difference measurement. Such a measurement based on monitoring the intensity changes of the non-quadrature-spaced samples may be limited only by the resolution of the analog to digital converter (ADC) used in analyzing the fringe spectrum. Since state of the art ADCs are readily available with resolutions above 1 part in 1,000,000, the various embodiments described herein can provide absolute optical path-length difference measurement that have a resolution as high as $\lambda_0/100,000$.

This ability to determine the absolute difference in optical path lengths with extremely high resolution allows various embodiments to be used to perform highly precise measurements of a number of parameters of physical systems at heretofore unachievable combinations of range and resolution. Specifically, to the extent a parameter of a physical system of interest, such as an external force and/or an environmental condition associated with the system, and/or a change therein can produce an interference pattern, the measurement of the absolute path-length difference enables determination of the parameter of interest within a broad range of magnitudes. As the measurement is performed at a high resolution using the same interference pattern, the determination of the parameter of interest not only can encompass a broad range of magnitudes but also can be performed with high precision.

Accordingly, in one aspect, an interferometric method facilitates measurement of an absolute optical path-length difference. The method includes (a) receiving in memory a first fringe spectrum that includes a number of non-quadrature spaced light intensity samples. Each sample corresponds to a different wavelength of light from several wavelengths. The several samples represent at least one full fringe cycle within the first fringe spectrum. The method also includes step (b) of selecting by a first processor a set of non-quadrature spaced samples from the several samples in the first spectrum. In addition, the method includes step (c) of computing by the first processor a first relative-phase measurement of the absolute optical path-length difference using the selected non-quadrature spaced samples.

In one embodiment, the selected set includes at least three non-quadrature spaced samples representing the at least one full fringe cycle in the spectrum. The number of the several wavelengths may ranges from about 3 up to about 4096. The fringe spectrum may include more than one fringe cycles, and a number of fringe cycles in the spectrum can be up to about 2048. The several wavelengths may range from a low wavelength up to a high wavelength that is greater than the low wavelength by a bandwidth. For example, the low wavelength may ranges from about 600 nm up to about 1590 nm, and the high wavelength may range from about 610 nm up to about 1600 nm. The bandwidth may range from about 10 nm up to about 200 nm.

In one embodiment, the computing step includes solving a set of equations. Each equation corresponding to a different wavelength in the several wavelengths and includes: (i) a term based on a relative phase $\phi$, $\phi$ being independent of the wavelength associated with the equation, and (ii) a term based on a phase shift estimate relating to both the wavelength corresponding to the equation and a reference absolute optical path-length difference, as explained below with reference to Equations (4) and (5).

The method may include normalizing by the first processor the first fringe spectrum to update the samples, prior to the selecting step (b). In some embodiments, the method includes determining by the first processor a number of samples in the set based on, at least in part, a specified minimum resolution of the first relative phase measurement. The minimum resolution may be specified as a fraction of a reference wavelength in the several wavelengths, and the fraction may range from about $1/1{,}000$ up to about $1/100{,}000$.

In one embodiment, the method further includes selecting a reference wavelength from the several wavelengths, and computing by the first processor: (d) a base estimate of the absolute optical path-length difference, that is based on, at least in part, the first fringe spectrum. The method may also include computing by the processor (e) a fringe number and a quadrant based on, at least in part, the base estimate and the selected reference wavelength, and computing (f) a first measurement of the absolute optical path-length difference by aggregating the first relative-phase measurement, the fringe number, and the quadrant, e.g., as described in Equation (6).

The method may include determining by a second processor a number of wavelengths and the values of the several wavelengths based on, at least in part, a parameter of the first measurement of the absolute optical path-length difference. That parameter may include a specified optical path-length difference upper limit, a specified resolution, or both. For example, the specified optical path-length difference upper limit may ranges from about 2 mm up to about 10 mm. Thus, the method may determine absolute optical path difference up to about 2 mm, 4 mm, 5 mm, 8 mm, 10 mm, etc. The specified resolution may ranges from about 10 pm up to about 1 nm.

In one embodiment, the computing step includes determining for each wavelength of the several wavelengths a phase shift estimate that: (i) corresponds to the wavelength, and (ii) is based on, at least in part, a reference absolute optical path-length difference. The method may also include solving a set of equations, each equation corresponding to a different wavelength in the several wavelengths. Each equation may include: (i) a first term based on a relative phase $\phi$, and (ii) a second term based on the phase shift estimate corresponding to the wavelength. The reference can be the coarse estimated obtained from frequency-domain analysis or a refined absolute optical path-length difference measurement obtained via one or more iterations of the relative-phase computations. These iterations can improving the precision of phase shift estimates. As such, in one embodiment the reference absolute optical path-length difference includes the base estimate In one embodiment, the method further includes repeating the computing step (c) to: (i) update, for each wavelength, the phase shift estimate and the second term, and (ii) obtain a refined first relative-phase measurement based on the updated second term. During the repetition the reference absolute optical path-length difference includes the first measurement, i.e., the first absolute optical path-length difference measurement from the previous iteration. The method may also include updating the first measurement of the absolute optical path-length difference by aggregating the refined first relative-phase measurement, the fringe number, and the quadrant.

In one embodiment, the method further includes (g) receiving in the memory a second fringe spectrum that includes several non-quadrature spaced light intensity samples. Each sample corresponds to a different wavelength of light from the various wavelengths, and the several samples representing at least one full fringe cycle within the second fringe spectrum. The method may also include (h) repeating steps (b) and (c) using the second fringe spectrum to obtain a second relative-phase measurement of the absolute optical path-length difference. The reference absolute optical path-length difference used in this iteration may include the first measurement of the absolute optical path-length difference. Additionally, the method may include computing by the first processor a second measurement of the absolute optical path-length difference by aggregating the second relative-phase measurement, the fringe number, and the quadrant.

In one embodiment, the method further includes the step of using the first measurement to calculate a parameter of interest of a physical system. The parameter of interest may be one or more of salinity, pressure, temperature, strain, vibration, distance, refractive index of a medium, and changes thereof.

In another aspect, a system is provided for measuring a system parameter using a measurement of absolute optical path-length difference. The system includes a receiver for receiving from a spectrometer a fringe spectrum. The fringe spectrum includes a number of non-quadrature spaced light intensity samples. Each sample corresponds to a different wavelength of radiation from several wavelengths. The various samples represent at least one full fringe cycle within the fringe spectrum. The system also includes a sampler for selecting a set of non-quadrature spaced samples from the various samples, and a relative-phase estimator for determining a relative-phase measurement of the absolute optical path-length difference using the selected non-quadrature spaced samples.

In one embodiment, the system further includes a coarse estimator configured for selecting a reference wavelength from the various wavelengths. The coarse estimator is also configured to determine: (i) a base estimate of the absolute optical path-length difference, based on, at least in part, the fringe spectrum, (ii) a fringe number and a quadrant based on, at least in part, the base estimate and the selected reference wavelength. In addition, the system may include an aggregator for deriving a measurement of the absolute optical path-length difference by aggregating the first relative-phase measurement, the fringe number, and the quadrant.

The system may additionally include a transducer including a sensor which, in response to an environmental condition, alters either a physical path or a refractive index, or both of a path of radiation. A spectrometer coupled to the transducer may generate the fringe spectrum based on, at least in part, a radiation received through the path of radiation. The aggregator may be further configured to determine a parameter corresponding to the environmental condition using the measurement of the absolute optical path-length difference. The parameter of interest may be one or more of salinity, pressure, temperature, strain, vibration, distance, refractive index of a medium, and changes thereof.

In one embodiment, the spectrometer includes N detectors, where N is greater than 2, to provide N non-quadrature spaced light intensity samples. The system may also include a radiation source adapted to emit at least N wavelengths of electromagnetic radiation, where N is at least equal to two. The radiation source may include a swept wavelength source, sweeping sequentially through the N wavelengths. In one embodiment, the radiation source includes a temperature and current stabilized 20 mW super-luminescent diode, having a wavelength centered at about 1061 nm and a full-width-half-maximum (FWHM) of about 33 nm.

The spectrometer may include several detector, e.g., an array of at least about 16 silicon photodiodes. The spectrometer may have a grating of about 1500 lines/mm to diffract an approximately 33 nm bandwidth about evenly over the 16 photodiodes.

DETAILED DESCRIPTION

Various embodiments evaluate the interference patterns produced by the recombination of two electromagnetic beams derived from a common radiation source, and that traveled unequal distances (path lengths) from the point of generation. Specifically, by evaluating the fringe spectrum intensities at multiple wavelengths across at least one full fringe cycle, phase shift and path length differentials may be calculated at a high resolution, e.g., up to 1/100,000-th of a wavelength.

Various embodiments described herein take advantage of the characteristics of multiple wavelength techniques and provide a method that extends them to n selectively spaced wavelengths that are monitored via a spectrometer. This new n-wavelength technique can be combined with the absolute path length techniques without requiring any changes to be made to existing spectral detection setups. In some embodiments, the detector image is analyzed in the frequency domain in order to determine an initial fringe number and quadrant. For subsequent measurements, however, the image is analyzed for local relative phase by demodulating the n spectrometer wavelengths using a set of n simultaneous linear equations relating to n non-quadrature-spaced intensity measurements. The resulting combined method can preserve the resolution, speed, and simplicity of the multiple wavelength relative phase techniques and combines them with the range, stability, and absolute measurement capabilities of the absolute path length spectral domain techniques.

When a low coherence interferometer is interrogated with an n-element spectral detector, where each element monitors wavelength $\lambda_i$, the image can be characterized by $$I_i = A + \gamma_i B \cos(2\pi L/\lambda_i) \quad (1)$$

where $I_i$ is the intensity measured by each of the n detectors, A is the mean interferometric intensity, B is the interferometric fringe amplitude, L is the optical path length difference, and $\gamma_i$ is the modulus of the degree of first order coherence (The dc gain term and offset for each detector element has been omitted for now, for the convenience of explanation). Assuming a Doppler-broadened source, $\gamma_i$, can be estimated by $$\gamma_i = \exp\left[-\left(\frac{\pi L \Delta \lambda_i}{2\sqrt{\ln(2)} \lambda_i^2}\right)^2\right] \quad (2)$$

where $\Delta\lambda_i$ is the spectral FWHM received by each detection element.

In one embodiment, the first step in demodulating the set of image points for absolute path length is to determine the starting fringe number, m, as well as the starting fringe quadrant. This can be done by analyzing the spectral image in the frequency domain using one of a number of existing techniques. It is useful to note that in many cases this first measurement does not need to be performed fast, so averaging can be applied over multiple images to increase precision.

In one embodiment, once the initial fringe number and quadrant are determined, the n-wavelength interrogation technique based on non-quadrature spaced intensity samples is used to perform high resolution, high speed relative phase measurements. To perform the relative phase measurements it is useful to re-write equation (1) as $$I_i = A + \gamma_i B \cos(\phi + \delta_i) \quad (3)$$

where $\phi = 2\pi L/\lambda_0$, $\delta_i = 2\pi L[(\lambda_0 - \lambda_i)/(\lambda_i \lambda_0)]$, and $\lambda_0$ is a known reference wavelength chosen from one of the $\lambda_i$ wavelengths. Expanding and re-writing equation (3) yields $$I_i = A + \gamma_i C_1 \cos(\delta_i) - \gamma_i C_2 \sin(\delta_i) \quad (4)$$

where $C_1 = B \cos(\phi)$ and $C_2 = B \sin(\phi)$.

In some embodiments the responses for $\gamma_i(L)$ and $\delta_i(L)$ can be calibrated beforehand. In some embodiments, $\gamma_i$ and the associated terms can be omitted. The calibration of $\delta_i(L)$ in involves determining $\lambda_i$, and can be done either by using a source with a known spectrum or by determining $\lambda_0$ and performing a calibration scan over the full interferometric range. The response for $\gamma_i(L)$ can also be determined by scanning the interferometer over its full range. Since $\gamma_i$ and $\delta_i$ vary slowly with respect to L, their initial values can be accurately estimated using the low resolution absolute path length measurement previously obtained. Now that $\gamma_i$ and $\delta_i$ are known quantities, equation (4) becomes a set of n overdetermined linear equations that can be solved for the unknowns A, $C_1$, and $C_2$. After solving for these variables, the relative phase can be determined by realizing that $$\phi = a \tan(C_2/C_1) \quad (5)$$

This relative phase measurement only as to be adjusted with respect to the starting quadrant. The result can then be converted to an absolute path length using $$L = \lambda_0(m + \phi/2\pi) \quad (6)$$

In some embodiments, to improve the precision of $\gamma_i$, $\delta_i$, and L, equations (4-6) can be iterated until a desired tolerance is reached. A similar approach is followed for subsequent measurements, however, instead of estimating $\gamma_i(L_t)$ and $\delta_i(L_t)$ using an absolute path length measurement, they can be initially estimated using the previous values $\gamma_i(L_{t-1})$ and $\delta_i(L_{t-1})$, where $L_t$ and $L_{t-1}$ are two consecutive measurements. For these subsequent measurements, fringe counting can be used to keep track of the total relative phase shift as long as the rate of change is less than π/measurement. This requirement also ensures that it is valid to use $L_{t-1}$ as a starting estimation for $\delta_i(L)$ and $\gamma_i(L)$. If the slew rate is faster, the absolute path length spectral domain method can once more be used to determine the fringe number and quadrant.

It is common for interferometers to simply measure an absolute path length, which typically means the difference between two arms of an interferometer, and in these cases it is ensured that the optical path length difference is within the system's coherence requirements. For example, if the system's coherence length, i.e., the maximum absolute path length difference for which the system can produce interference, is 0.25 mm, the system is typically constructed such that the absolute path length difference to be measured is much less than 0.25 mm. Various embodiments described herein, however, are configured to measure an optical path length that is longer than the system's coherence length. For example, in one embodiment, the system's coherence length is 0.25 mm, and the path length to be measured is roughly 20 mm. Therefore, a differential interferometer (often called a path-matching differential interferometer (PMDI)) can be constructed that measures the difference between two absolute path lengths. As described above, each absolute path length itself is a difference between two arms of one interferometer.

Using a PMDI, an interference pattern is obtained by maintaining the difference between the absolute path lengths to a value less than the system's coherence length. For example, in one embodiment, one optical path length is 20 mm and the second optical path length is maintained at 20 mm±0.25 mm. It should be understood the values described herein are exemplary, and that values of optical path length and absolute path length that are smaller or larger are contemplated. For example, the optical path length can be 10 mm, 15, mm, 25 mm, etc.

Figure 2A:
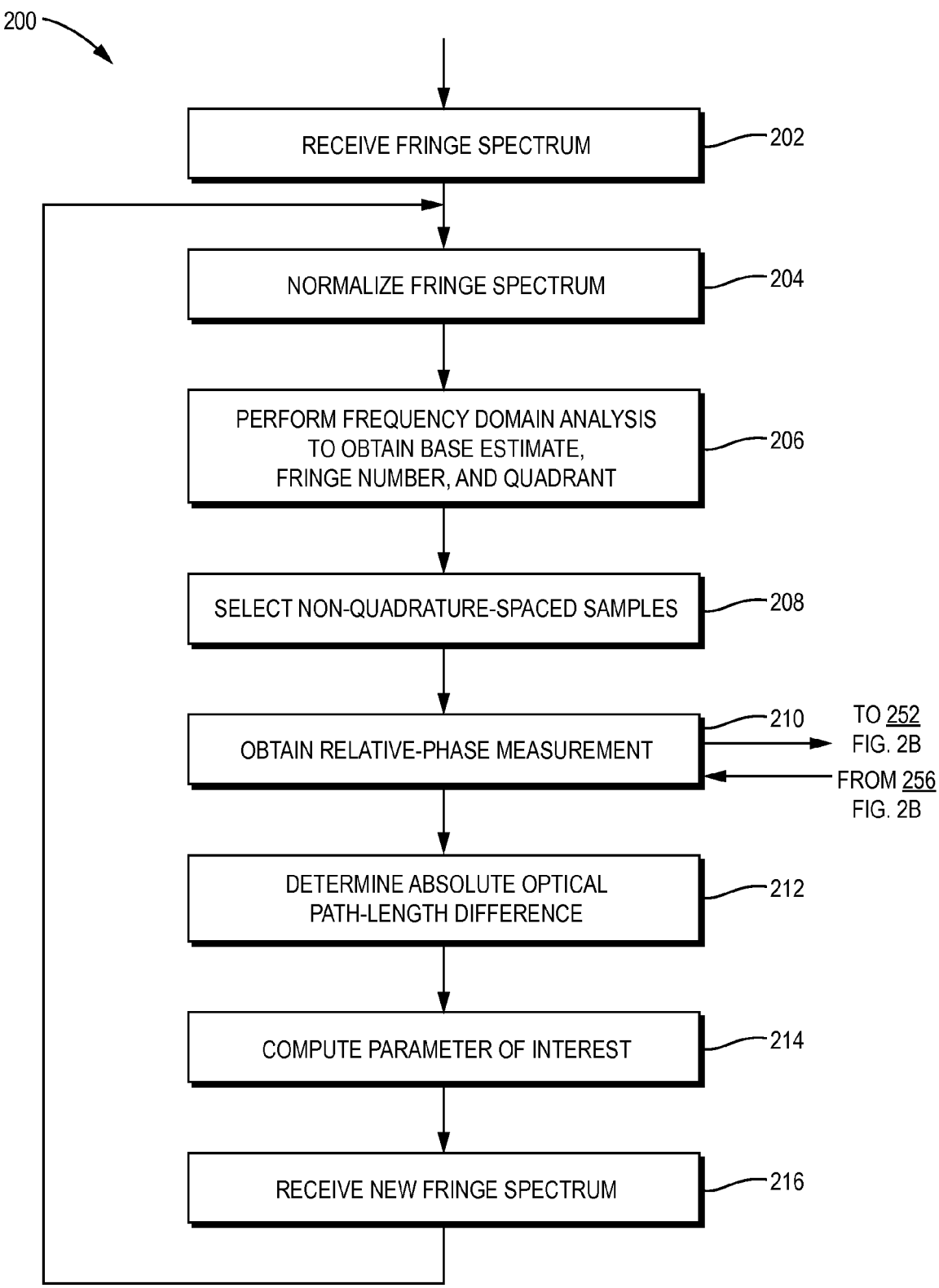
FIG. 2A illustrates a process of obtaining high resolution absolute optical path-length different measurements, according to one embodiment.

With reference to FIGS. 1B and 2A, in a process 200 for obtaining a high resolution relative-phase measurement of the absolute optical path-length difference, a fringe spectrum 152 is received in step 202. The fringe spectrum, in general, may be produced by interference of two related beams of light, as described above, and may be supplied by a spectrometer. The fringe spectrum 152 includes several light intensity samples 154a-154q. Each sample corresponds to a different wavelength of light. A waveform relating intensities of the samples to the wavelengths thereof can be determined from the light intensity samples such that each sample substantially coincides with a unique point on the waveform. For example, the waveform 156 was derived from the samples 154a-154p. The waveform corresponding to a fringe spectrum generally includes one or more full fringe cycles.

A fringe cycle period is a distance between two adjacent local maximums (peaks) of the waveform corresponding to a fringe spectrum. The distance between two adjacent local minimums (valleys) is substantially the same as the distance between two adjacent peaks. A full fringe cycle typically includes a portion of the waveform and the corresponding samples between any two points on the waveform that are separated by a distance approximately equal to the fringe cycle period, along the wavelength axis.

To illustrate, points 158a, 158b represent adjacent peaks of the waveform 156. The distance between the peaks is $\tau$ and, as such, the fringe cycle period is $\tau$. The portion of the waveform 156 between the peaks 158a, 158b is a full fringe cycle 160. The fringe cycle 160 includes the samples 154e, 154f, 154g. The points 162a, 162b represent adjacent valleys of the waveform 156, and the distance therebetween is also $\tau$. As such, the portion of the waveform 156 between the valleys 162a, 162b is a different full fringe cycle 164. The fringe cycle 164 includes the samples 154j, 154k, 154l. The points 166a, 166b are neither peaks nor valleys, but these two points are separated by the fringe cycle period $\tau$ and, as such, the portion of the waveform 156 between the points 166a, 166b is also a full fringe cycle 168, which includes the samples 154f, 154g, 154h.

A full fringe cycle having a period $\tau$ can be divided into four quadrants respectively starting at distances 0, $\tau/4$, $\tau/2$, and $3\tau/4$ from the start of the fringe cycle. The phases corresponding to these quadrants are 0, $\pi/2$, $\pi$, and $3\pi/2$, respectively. The samples separated in phase by approximately $\tau/4$ are called quadrature-spaced samples and if any two consecutive samples in a set of samples is separated in phase by an amount different than $\tau/4$, the samples in that set are called non-quadrature-spaced samples. A typical spectrometer usually provides non-quadrature samples. The fringe spectrum received in step 202 includes at least one full fringe cycle and at least one pair of non-quadrature-spaced samples. As such, the samples in the received fringe spectrum are non-quadrature spaced. It should be understood that the fringe spectrum 152 is illustrative and that fringe spectrums that include as few as three and up to several thousand (e.g., 2000, 5000, 10,000) samples, one or more of which are non-quadrature samples, are within the scope of the present invention.

In an optional step 204, the received fringe spectrum (e.g., the spectrum 152) is normalized using known techniques, such as pre-calibration, Hilbert transform, etc. In normalization, generally the intensity of each sample corresponding to the spectrum is individually scaled such that in a waveform corresponding to the normalized spectrum all peaks have substantially the same intensities (e.g., +1) and all valleys have substantially the same intensities (e.g., −1). If the normalization method requires input parameters that are path-length dependent, iteration may be used to improve the accuracy of normalization.

In another optional step 206, the spectrum (unmodified or normalized) is analyzed using a frequency-domain technique to obtain a coarse estimate (i.e., a base estimate) of the absolute optical path-length difference. In addition, one of the wavelengths corresponding to the received spectrum (e.g., the spectrum 152) is selected as a reference wavelength. Often, the wavelength corresponding to the highest peak is selected as the reference wavelength. Using the base estimate and the selected reference wavelength, a fringe number m and a quadrant q are also computed in the step 206. These estimations and computations can be performed using known frequency-domain analysis techniques such as Fourier transform, peak detection, and different types of linear fits. It is useful to note that in many cases this first measurement does not need to be performed fast, so averaging can be applied over sample sets to increase precision. Alternatively, or in addition, other sensors or instruments can be used to estimate the absolute value of the measurement parameter to compute the estimate of absolute optical path-length difference.

In step 208, a set of non-quadrature spaced samples is selected from the samples in the received fringe spectrum. For example, the samples 154f, 154g, 154h, 154i may be selected, or the samples 154b-154m may be selected. If not selected in a previous step, a reference wavelength $\lambda_0$ is selected in the step 208. Using the selected non-quadrature spaced samples and the reference wavelength, a high resolution relative-phase measurement of the absolute optical path-length difference is computed in step 210, as described below with reference to FIG. 2B. In an optional step 212, a high-resolution measurement of the absolute optical path-length difference is obtained using the relative-phase measurement, and the fringe number and the quadrant computed in the optional step 206 using, e.g., the expression L1=$\lambda_0$ (m+q+($\phi/2\pi$)), where m is an integer and q can be 0, ¼, ½, ¾. In this expression, L1 is the high-resolution absolute path-length difference measurement, $\lambda_0$ is the selected reference wavelength, m and q are the fringe number and the quadrant, respectively, and $\phi$ is the high resolution relative phase measurement.

In one embodiment, the computation of high-resolution relative phase measurement involves solving a system of equations. Each equation in the system corresponds to a different wavelength, denoted $\lambda i$, in the received spectrum, and can represent the intensity of the corresponding sample as a function of a term based on the relative phase $\phi$, and a term based on a phase shift estimate, denoted $\delta_i(L)$. The phase shift estimate can be expressed as $\delta_i(L)=2\pi L[(\lambda_0-\lambda_i)/(\lambda_i\lambda_0)]$ depends on both the wavelength $\lambda i$ and the absolute optical path-length difference L, which is to be measured. The phase shift estimate $\delta_i$ (L) can also be called a phase shift differential. If the wavelength corresponding to the sample 154h is selected as the reference wavelength, denoted $\lambda_0$ in FIG. 1B, the distance between the sample 154h and sample 154i, along the wavelength axis, represents the phase shift $\delta$ corresponding to the wavelength corresponding to the sample 154i. The distance between the sample 154h and the peak 158b of the corresponding fringe cycle represents the relative phase $\phi$.

Figure 2B:
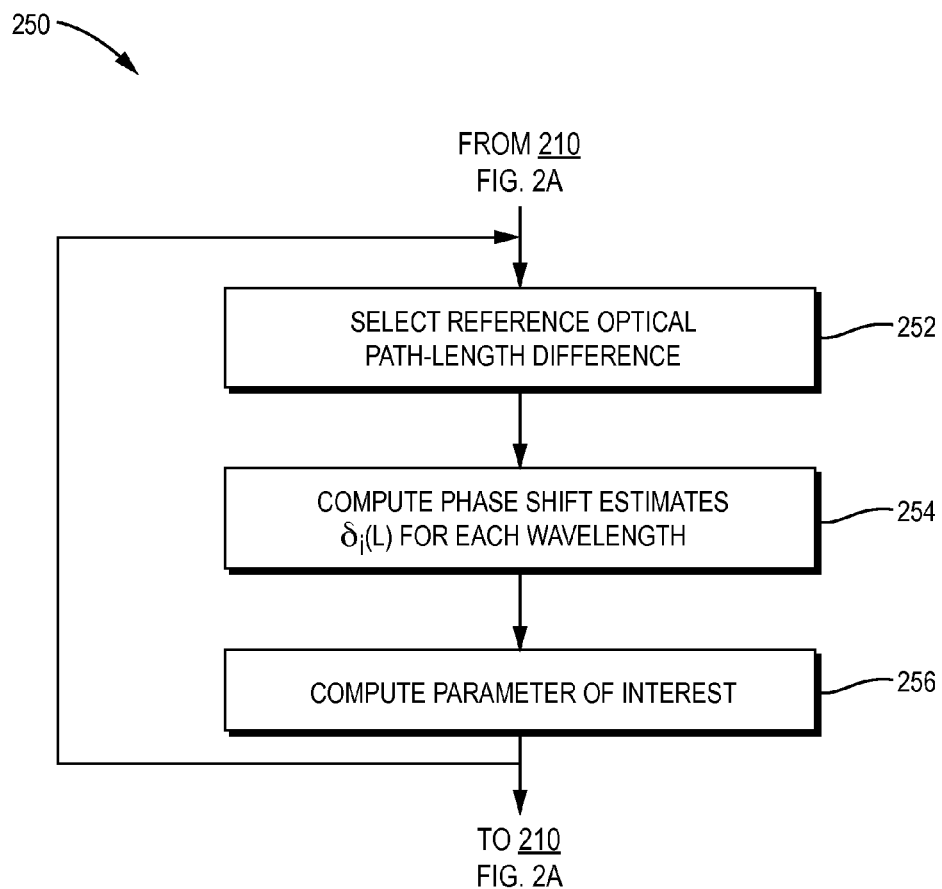
FIG. 2B illustrates a sub-process corresponding to one of the process steps illustrated in FIG. 2A.

With reference to FIG. 2B, in a process 250, a reference optical path-length difference is selected in step 252 as described below, and the phase shift estimates $\delta_i(L)$ for each wavelength $\lambda_i$ are computed in step 254. The corresponding system of linear equations is solved in step 256 to obtain a high resolution relative phase measurement. The high-resolution measurement of the absolute optical path-length difference computed in the optional step 212 can be used as the reference optical path-length difference in the next iteration of the process 250. In any subsequent iterations, the measurement of the absolute optical path-length difference computed in the optional step 212 of the previous iteration can be selected in the step 252 as the reference optical path-length difference for that iteration.

As the absolute optical path-length difference L is to be measured, the first time this computation is performed, the value of L is not known. As such, the base estimate of the absolute optical path-length difference computed in step 256 is used as L. Thus, in the system of equations, the sample intensities and the phase-shift-based terms are known and the relative phase $\phi$ can be computed by solving the system of equations. The solution of the set of linear equations (e.g., Equation 4) may provide three values: an offset A, and two amplitudes C1 and C2. The two amplitudes can be used to calculate a measurement of the relative phase $\phi$ using Equation 5. Thereafter, in the optional step 212, a high-resolution measurement of the absolute optical path-length difference L1 can be obtained using the relative-phase measurement $\phi$.

Recall, in the first iteration each phase shift estimate $\delta_i(L)$ corresponding to each wavelength $\lambda_i$ was computed using the base estimate. In some embodiments, when a high-resolution measurement of the absolute optical path-length difference L1 is computed, that measurement is used to re-compute each phase shift estimate $\delta_i(L)$, as described above with reference to FIG. 2B. This can yield more accurate values of $\delta_i(L)$ because the value of L used in this iteration, L1, is generally more accurate than the base estimate. Using these more accurate values of $\delta_i(L)$, the equations can be solved again (i.e., the step 256 is repeated), to obtain a more accurate measurement of the relative phase $\phi$. Thereafter, the step 212 may be repeated using the refined, more accurate measurement of the relative phase to obtain an updated, more accurate value L2 of the absolute optical path-length difference. These steps may be repeated several times, as described with reference to FIG. 2B, so as to iteratively refine the values of $\delta_i(L)$, the relative phase measurement, and/or the measurement of the absolute optical path-length difference.

The fringe spectrum received in the step 202 can represent an environmental condition related to parameters such as a certain salinity of a fluid, pressure, temperature, strain, vibration, location of an object, the refractive index of a medium, and changes in the values of any of these parameters, etc. The absolute optical path-length difference computed using the fringe spectrum, thus relates to one or more of these parameters and to the environmental condition. Therefore, in an optional step 214, the measured absolute optical path-length difference can be used to determine, e.g., to quantify the associated environmental condition. For example, using the measured absolute optical path-length difference water temperature and/or salinity can be accurately estimated, pressure applied to an object can be determined, etc.

In some instances, when there is change in an environmental condition, the absolute difference between the two optical paths changes, generating a new spectrum. In an optional step 216, this new spectrum is received. Thereafter, one or more of the steps 202-212 are optionally repeated using the new spectrum. In one embodiment, only the steps 208, 210 are repeated, i.e., a base estimate based on the new spectrum is not computed. As such, in computing phase shift estimate $\delta_i(L)$ for solving the system of equations, the measurement of the absolute optical path-length difference computed based on the previously received spectrum is used. By analyzing a change in the relative phase measurements corresponding to the new and the previous spectra the fringe number and/or quadrant increments or decrements can be determined. Specifically, if consecutive spectra are acquired fast enough, a typical change between relative phase measurements is less than $\pi/2$. When a fringe and/or quadrant changes, however, the change in the relative phase measurement is typically greater than $\pi/2$, resulting in a discontinuity in the optical path length measurements. This discontinuity can be corrected by incrementing or decrementing the fringe number in the step 212.

In solving the equations, the intensities associated with the new spectrum are used to obtain a new high resolution relative-phase measurement. This new measurement and the previously computed fringe number and quadrant, adjusted if necessary as described above, are used to compute a new high resolution measurement of the absolute optical path-length difference. As described above, the new high resolution measurement of the absolute optical path-length difference can be iteratively refined. One of the advantages of this embodiment is that the step 206, which can be time consuming and/or costly, can be avoided in measuring the absolute optical path-length difference corresponding to the new spectrum. This process can be repeated for additional fringe spectra corresponding to gradual changes in the parameter being measured. Thus, a parameter of interest can be efficiently tracked by performing the computationally expensive and/or slow frequency-domain analysis only once, and then repeating relative-phase measurements as necessary.

Various embodiments can analyze any interference pattern produced by the super position of two or more related waveforms. In some embodiments the light used includes low coherence light, e.g., light that has a bandwidth ranging from about 10 nm up to about 400 nm in the ultraviolet, visible, or infrared regions of the electromagnetic spectrum. In another embodiment, the light source may be produced by overlapping three or more high coherence light beams at different wavelengths, which may increase system complexity and/or cost. In other embodiments, the light may be high coherence light with bandwidth less than 10 nm.

Beam splitting, which may occur more than once along the optical paths, may be accomplished by any suitable method (e.g. light may be split either by amplitude-division or wavefront-division). Exemplary beam splitting methods compatible with the various embodiments described above include, using a beam splitter, an optical fiber coupler, and/or a reflection from a metallic or dielectric surface, and/or using two axes of a birefringent fiber for subjecting two polarization axes of a single beam to two different indices of refraction. In some embodiments beam splitting is accomplished by a Fresnel reflection which occurs at the interface between the core of an optical fiber and a medium with a refractive index different than that of the fiber core.

Generally, any path geometry can be employed in the systems and methods described in various embodiments, as long as two paths have different optical path lengths. In some embodiments the optical paths include solid state paths (e.g. a path within an optical fiber or other light transmitting solid). In other embodiments, the path may be through a vacuum, air, or other suitable liquid or gaseous medium.

Typically, one or more of the paths have either a variable physical length, or a variable index of refraction, or both.

Typically, an interference pattern is monitored using a detector capable of monitoring at least three wavelengths across at least one full fringe cycle. This can be accomplished using a spectrometer, or the individual components therein. In various embodiments, these components include wavelength separators such as a diffraction grating, a volume holographic grating, a prism, fiber optic or bulk optic filters, etc. The detector may include a photodiode, charge coupled device (CCD), or CMOS array of three or more detection elements, not necessarily arranged linearly. In some embodiments a low coherence source is scanned using a wavelength-tunable filter, and a single detector element (e.g., a photodiode) is used for detection. Another embodiment includes a tunable wavelength source and a single detector element.

In some embodiments, a spectrometer with a range of about 10 nm up to about 200 nm between wavelengths ranging from about 600 nm up to about 1600 nm is used. The spectral resolution of this embodiment can be between about 0.1 nm up to about 2 nm. In some embodiments, a superluminescent diode or LED between 100 nW and 1W in output power is used as a light source. The wavelength specification of this source may match that of the spectrometer/detector, such that the various sets of wavelengths may have bandwidths varying between about 10 nm up to about 200 nm. The wavelengths may vary in the range from about 600 nm up to about 1600 nm.

The sample points (i.e., intensity measurements) to be selected from a received fringe spectrum for further analysis (e.g., relative-phase measurement) can be determined by a processor receiving inputs from the detectors or by the detectors themselves. A typical number of points selected can range from 3 up to about 4096 pixels. In some embodiments, the intensity measurements/sample points are selected from at least one full fringe cycle. If more than one fringe cycles are available in the fringe spectrum, the spectrum may be sampled according to the Nyquist criterion i.e., at least two samples per fringe cycle are selected for subsequent analysis. A typical fringe spectrum includes from 2 up to 2000 fringe cycles. In general, in an interferometric system, the coherence properties of the light captured by any detector element influences the dynamic range of the system. Decreasing the bandwidth of the light on all the pixels can increases the dynamic range of the system.

Practical applications of the systems and methods described herein include the measurement of any parameter that can cause change in a physical distance and/or a refractive index including, physical distance, refractive index, atmospheric or hydrostatic pressure (P), temperature (T), sound pressure levels (SPL), vibration, strain, and chemical concentration and composition. Each of the aforementioned employs at least one beam path which reproducibly changes the optical length thereof in response to changes in the corresponding parameter. As such, in various embodiments the beam paths are designed to change a physical length and/or index of refraction thereof in response to a physical parameter to be measured. The change in optical path length may occur as a direct effect of the parameter to be measured or a change therein, or via a transducer.

For accurate, reliable measurements of a parameter of interest, in various embodiments the path length is beneficially constructed to predictably vary in response to the parameter to be measured (e.g. pressure, temperature, etc.).

In general, one or both path lengths may vary in response to the parameter being measured. To measure pressure and/or a change therein the deflection of a diaphragm or membrane due to applied pressure can be monitored. A change in birefringence of an optical fiber, a change in refractive index of a medium due to applied pressure, and/or the strain, e.g., change in size of a medium due to applied pressure may also be monitored.

In one embodiment, an optical fiber is placed opposite a reflective surface that moves in response to pressure, such as a diaphragm. In another embodiment, an optical fiber is placed within an optical cavity the length of which changes with pressure. In one embodiment, a birefringent fiber is used to expose light to two refractive indexes that vary with pressure. To measure strain, an optical fiber can be placed within an optical cavity the length of which changes with strain. Alternatively or in addition, an optical cavity may be generated within an optical fiber, such that the length of the cavity changes with strain, so as to measure the strain and/or changes therein To measure temperature and/or changes therein the change in refractive index of a medium due to temperature and/or the strain, e.g., change in size of a medium due to temperature can be measured. As such, an optical fiber may be placed within an optical cavity the length of which can change with temperature. Alternatively, or in addition, an optical cavity may be generated within an optical fiber, such that the length of the cavity changes with temperature, so as to measure the temperature and/or changes therein.

In some embodiments, change in the refractive index of a solid, liquid, or gas, due to changing chemical composition thereof are monitored. To this end, in one embodiment, to measure a refractive index of a medium and/or a change therein, an optical fiber is located opposite from a mirror such that light exits the fiber, travels through the medium, reflects off the mirror, travels through the sample again, and re-enters the fiber. To measure vibration, in one embodiment an optical fiber is placed opposite a reflective cantilever or surface that undergoes vibration. In some embodiments, an optical fiber is placed opposite a reflective surface, and the distance between the fiber tip and the mirror is monitored.

Figure 3:
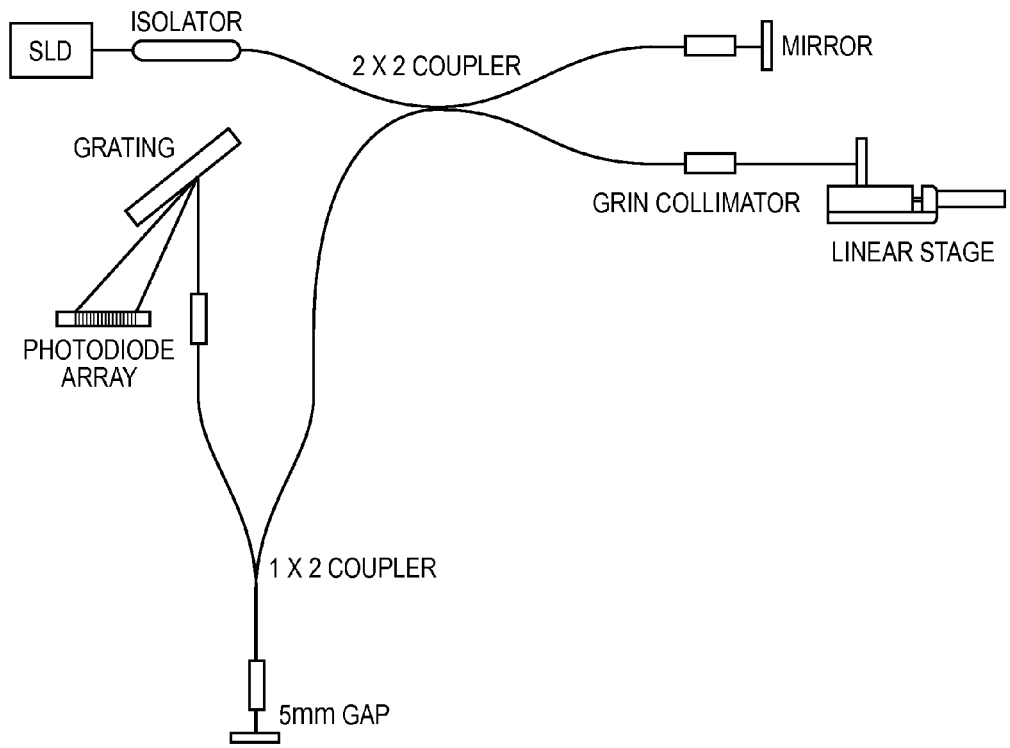
FIG. 3 schematically depicts a measurement and calibration system, according to one embodiment.

The n-wavelength interrogation technique was demonstrated using an embodiment using a fiber optic path-matching interferometer that was designed to perform high resolution refractive index measurements in a 5 mm sample cavity as depicted in FIG. 3. However, in order to demonstrate the n-wavelength interrogation technique, it was more practical to use the system not as a refractive index sensor, but instead, as a displacement sensor that monitored the position, D, of the linear stage, where D=L/2, and L is the difference in optical path length differences between the Michelson-style sensing interferometer and the Fabry-Perot-style receiving interferometer, which for this experiment, contained air of constant refractive index. The Michelson sensing interferometer was formed using a 2×2 polarization maintaining coupler with grin collimators at both outputs. One arm of the Michelson sensing interferometer was placed opposite a fixed mirror, and the other was placed opposite a mirror mounted to a motorized linear stage. The Fabry-Perot receiving interferometer was formed using a 1×2 PM coupler also with a grin collimator at the output. To create the reference reflection for the receiving cavity, the fiber end was polished flat resulting in a 4% reference reflection at the air gap just behind the grin lens. To equalize the intensity of the reference and the mirror-returned reflections, the length of the grin lens was adjusted slightly by polishing to reduce the coupling efficiency of the mirror-returned reflection until it matched the intensity of the reference reflection.

The source was a temperature and current stabilized 20 mW superluminescent diode centered at 1061 nm, and it had a FWHM of 33 nm. The detector was a simple spectrometer created using a 1500 lines/mm grating to diffract the 33 nm bandwidth evenly over a 16 element Si photodiode array. For this system, n was intentionally chosen to be low to optimize for resolution over a short range. The spectral width received by each detection element was approximately 2.2 nm, and this theoretically results in a 95 um working range with less than 50% signal attenuation that is between 17 um<D<112 um. The 16 signals were digitized using a 20-bit ADC at a rate of 1 kHz. All fiber in the system was polarization maintaining in order to maximize stability as well as grating efficiency.

Figure 4:
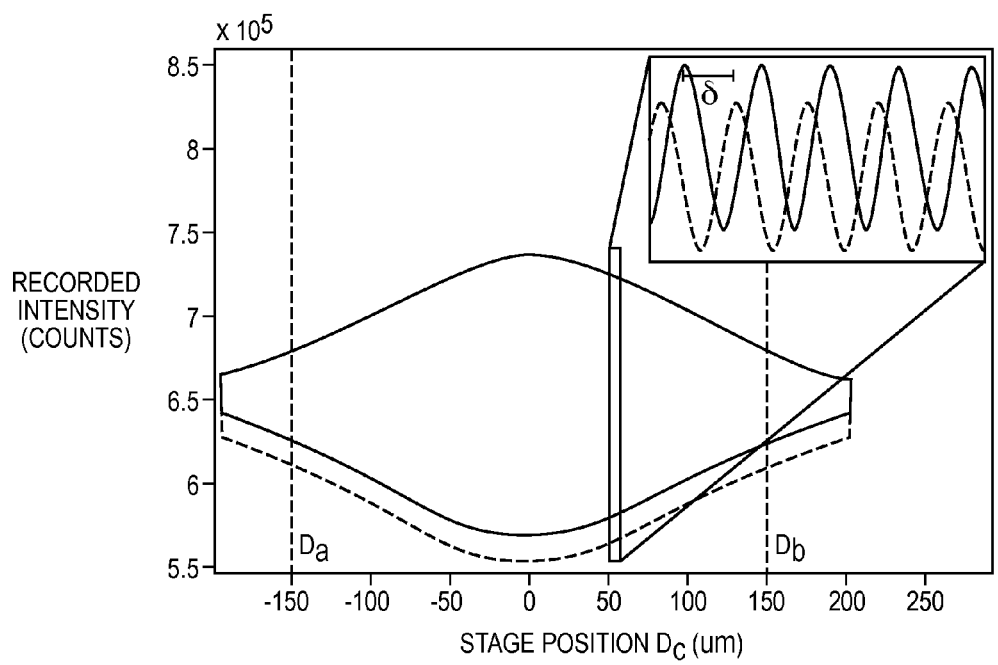
FIG. 4 depicts a calibration scan, according to one embodiment.

During this experiment the response of each detection element was characterized by $$I_i = G_i[A + \gamma_i B \cos(2\pi\lambda_i/L)] + b_i \qquad (7)$$

which is similar to equation (1) with the addition of constants $G_i$ and $b_i$ to respectively account for the gain and dark offset of each detection element. To determine $b_i$, a dark spectrum was acquired while the SLD was not powered. In order to determine $G_i$, $\gamma_i$, and $\lambda_i$ a calibration was performed by scanning the stage over a distance of about 400 um across D=0. FIG. 4 shows the intensity recorded for two of the 16 detection elements during the calibration scan. Initially, the position of the stage during the calibration scan, $D_c$, was not accurately known since the stage motion was not completely smooth. So it was first necessary to select the reference signal, $I_o$, and determine its corresponding wavelength, $\lambda_0$, to use in subsequently determining $L_c$. This was done by first calculating $G_i$ from the DC offset of each signal after $b_i$ was subtracted out. Then we selected $I_o$ to be the signal with the highest gain, and for it to correspond to the SLD's peak wavelength of 1065 nm. Next, that signal's zero crossings with respect to the central fringe were counted to generate $D_c$.

Once $D_c$ was determined, $\gamma_i(D_c)$ was determined by measuring the fringe amplitude as a function of $D_c$ for each signal using consecutive maxima and minima. Finally, $\lambda_i$ was calibrated by calculating the total relative phase shift, $\Delta\emptyset_{ab}$, of all the signals at two randomly selected positions $D_a$ and $D_b$, that were widely spaced on either side of the central fringe and using the relation $$\frac{\lambda_i}{\Delta D} = 2\pi/\Delta\emptyset_{ab} \qquad (8)$$

Rather than using $\Delta D = \Delta D_{ab}$ to calculate $\lambda_i$, $\Delta D$ was set to 1, and the result was normalized by requiring that $\lambda_i = \lambda_0$ for signal $I_o$. It was also possible to repeat this calculation for numerous points a and b to increase the precision of $\lambda_i$.

In one embodiment, the interferometer uses an illumination source that emits and receives N (e.g., 16, 32, etc.) wavelengths simultaneously. The intensity of the N wavelengths is acquired simultaneously by N detector elements, and the linear equation processing is performed on the acquired N samples. In other embodiments, a swept wavelength system uses a source that emits only one wavelength at a time, but the wavelength can be varied at different times. As such, this system acquires the N samples by varying the wavelength through N different wavelengths at different times, and by using only one photodiode to record N samples at N points in time. Those samples are then processed together, as described above.

Figure 5A:
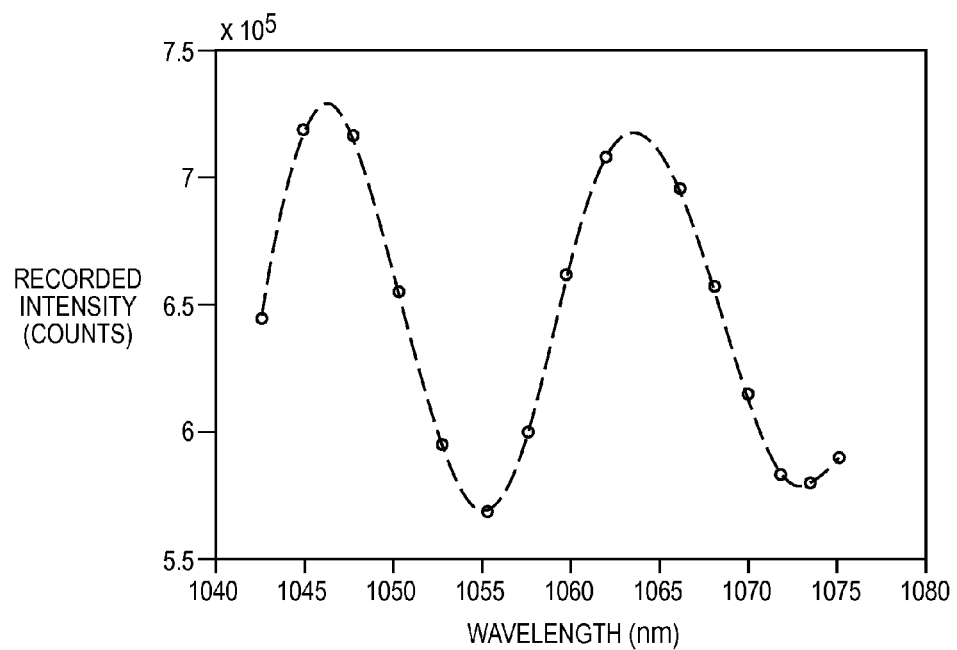
FIGS. 5A-5B depict a fringe spectrum and related waveforms, according to one embodiment.

After the calibration parameters were determined, the initial position of the interferometer was actively set by moving the mirror on the linear stage so that D was within the system's working range. FIG. 5A shows the detector image recorded at this starting position. The image in the figure is corrected for $G_i$ and $b_i$ but not $\gamma_i$. Next, the fringe number and quadrant for the initial position were determined by performing an absolute path length calculation on the spectral image. As previously indicated, there are a number of existing methods that can be used for this step, and the robustness of each method is sensitive to both n and the number of fringes in the image. Accordingly, several methods were tested beforehand, and the method described by proved to be the most robust for our setup, resulting in a typical error of ±1 fringe. It should be noted that the accuracy with which the initial position can be determined increases significantly for systems with higher n and for starting positions with more fringes.

Figure 5B:
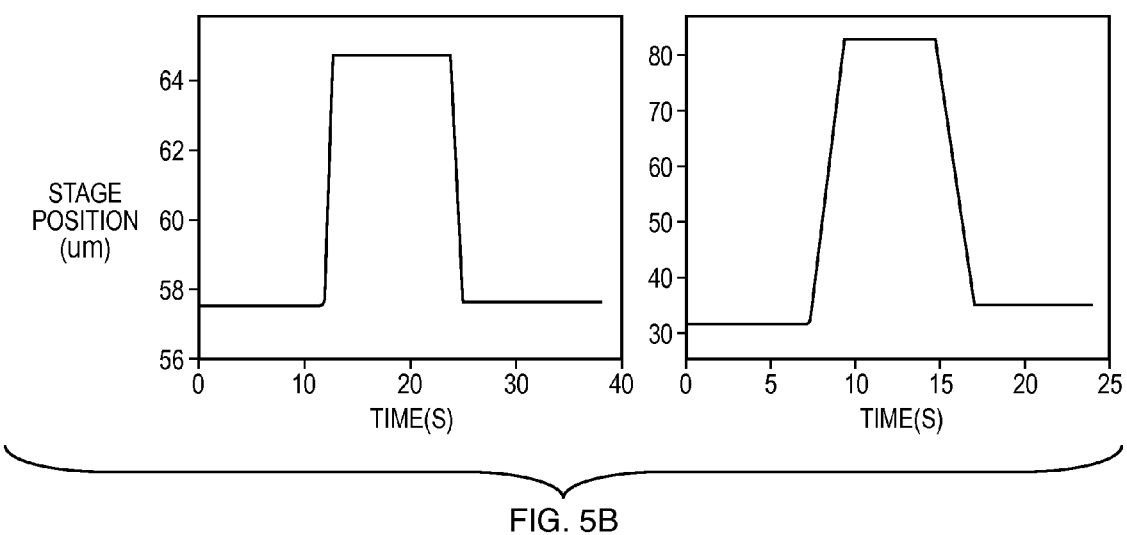
Figure 6:
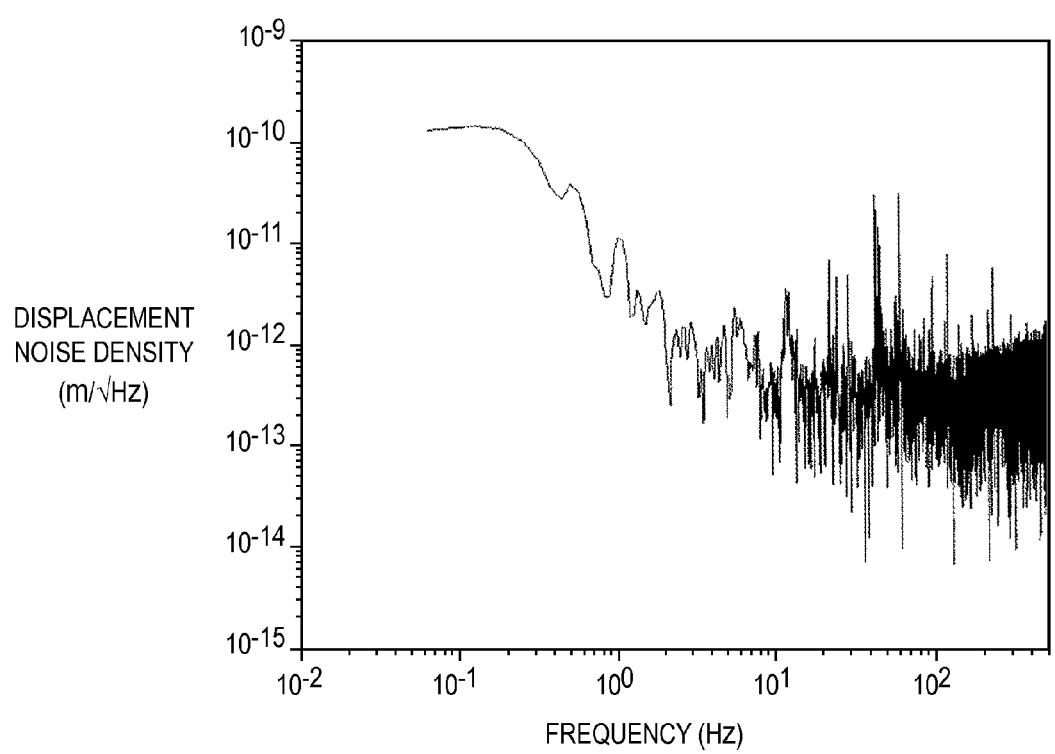
FIG. 6 depicts a calibration waveform, according to one embodiment.

After the initial position had been determined, a short 10 μm/s move was performed with an acquisition rate of 1 kHz, and the new interrogation method was used demodulate the signal. The full process, including resetting the starting position, was also repeated a second time for longer move. The two moves were intended to be 10 um and 50 um, respectively, but since the stage was not backlash compensated, the resulting forward motions were roughly 7 um and 51 um respectively. FIG. 5B shows the results of these moves, and they indicate that the system can achieve high resolution over a large dynamic range. FIG. 6 shows the power spectrum density (PSD) of the stable signal corresponding to the first 10 seconds of the 7 um move, and it indicates that the noise floor of the system is better than 0.5 pm/Hz$^{-1/2}$. When summed over the 500 Hz Nyquist bandwidth, this results in a total noise amplitude of 11 pm. This noise figure approaches the shot noise limit for the detected power (roughly 250 nW per detector element) as well as the analog-to-digital (ADC) quantization noise limit, which together result in a displacement noise of about 0.15 pm/Hz$^{-1/2}$.

The working range of the described embodiment is 95 um with 50 percent attenuation, and accordingly the noise figure indicates a range to resolution ratio of better than $8\times10^6$. It is also worthwhile noting that this ratio could be improved considerably by using a detector with more elements, each receiving a smaller spectral bandwidth. For a 1024-element spectrometer as the detector, each element would receive a spectral width of approximately 0.03 nm, and this would extend the 50 percent attenuation limit to just over 8 mm. Of course the resolution would decrease by a factor of $(1024/16)^{1/2}$ to 176 pm, but this would still result in a range to resolution ratio of around $4\times10^7$. This could theoretically be improved even further by using a stronger source, or by using an interferometric setup with lower loss.

When compared to previous relative phase interrogation methods, the systems and methods described herein provide the advantages of high resolution, and high speed, and they do so while considerably expanding the working range. They also alleviates the need to precisely tune to quadrature. In terms of the method's absolute measurement capabilities, it greatly enhances resolution when compared to previous absolute path length methods, and in cases for which the initial fringe position is determined with sufficient accuracy, the systems and methods exhibit both high resolution and high accuracy. In addition, this technique is not limited to low coherence interferometers, and is applicable to any interferometer using a multiple wavelength source.

Figure 7:
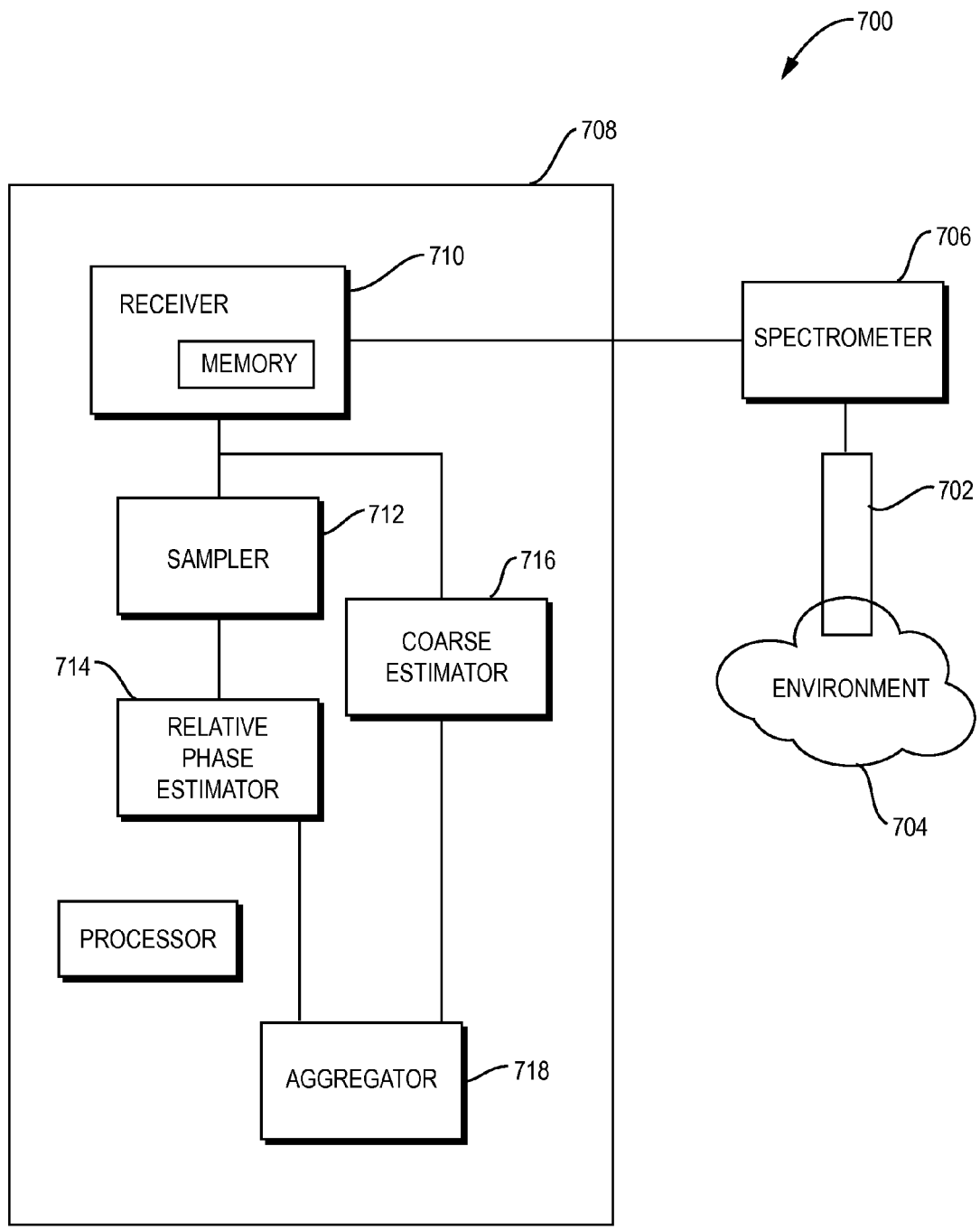
FIG. 7 schematically depicts an absolute optical path-length difference measurement system, according to one embodiment.

With reference to FIG. 7, a transducer 702 (such a pressure, temperature, salinity, sensor) may sense a condition (e.g., salinity, pressure, temperature, strain, vibration, distance, refractive index of a medium, and changes thereof) of an environment 704. In response, the transducer 702 may alter either a physical path or radiation, a refractive index, or both. In response, the spectrometer 706 may generate an interference pattern and provide a fringe spectrum to the analysis system 708. The receiver 710 can store and/or supply the spectrum to a sampler 712. The sampler 712 may select a set of non-quadrature-spaced samples, and the relative phase estimator 714 can compute a relative phase measurement using the selected samples. The coarse estimator 716 can generate an absolute optical path-length difference estimate of the change in the optical path introduced by the transducer 702, and a fringe number and quadrant corresponding to that estimate. The aggregator 718 may combine the fringe number, the quadrant, and the relative phase measurement to provide a high resolution measurement of the absolute optical path-length difference.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. An interferometric method of facilitating a measurement of an absolute optical path-length difference, the method comprising the steps of:
  (a) receiving in memory, a first fringe spectrum, from an interferometer comprising two optical paths having an absolute optical path-length difference therebetween that is to be measured, the first fringe spectrum comprising a plurality of non-quadrature spaced light intensity samples, each sample corresponding to a different wavelength of light from a plurality of monitored wavelengths, and the plurality of samples representing at least one full fringe cycle within the first fringe spectrum;
  (b) determining based on, at least in part, the first fringe spectrum a base estimate of the absolute optical path-length difference, a fringe number, and a quadrant;
  (c) selecting by a first processor a set of non-quadrature spaced samples from the plurality of samples;
  (d) computing by the first processor a first relative-phase measurement of the absolute optical path-length difference using the selected non-quadrature spaced light-intensity samples, by expressing each light intensity sample as a combination comprising: (i) a term based on a relative phase $\phi$ that is based on a reference wavelength and is independent of the monitored wavelengths, and (ii) a term based on a phase shift estimate $\delta_i(L)$ relating to both the monitored wavelength corresponding to the light intensity sample and the base estimate of the absolute optical path-length difference; and
  (e) computing a first measurement of the absolute optical path-length difference by aggregating the first relative-phase measurement, the fringe number, and the quadrant.

2. The method of claim 1, wherein:
  a number of wavelengths in the plurality of wavelengths ranges from 3 up to 4096; and
  the fringe spectrum comprises a plurality of fringe cycles, and a number of fringe cycles is up to 2048.

3. The method of claim 1, wherein:
  the plurality of wavelengths range from a low wavelength up to a high wavelength that is greater than the low wavelength by a bandwidth;
  the low wavelength ranges from 600 nm up to 1590 nm;
  the high wavelength ranges from 610 nm up to 1600 nm; and
  the bandwidth ranges from 10 nm up to 200 nm.

4. The method of claim 1, wherein the selected set comprises at least three non-quadrature spaced samples representing the at least one full fringe cycle.

5. The method of claim 1, wherein the computing step comprises solving a set of equations, each equation corresponding to a different wavelength in the plurality of wavelengths and comprising: (i) a term based on a relative phase $\phi$, and (ii) a term based on a phase shift estimate $\delta_i(L)$ relating to both the wavelength corresponding to the equation and the base estimate of the absolute optical path-length difference.

6. The method of claim 1, further comprising normalizing by the first processor the first fringe spectrum to update the samples, prior to the selecting step (b).

7. The method of claim 1, further comprising determining by the first processor a number of samples in the set based on, at least in part, a specified minimum resolution of the first relative phase measurement.

8. The method of claim 7, wherein the minimum resolution is specified as a fraction of a reference wavelength in the plurality of wavelengths, and the fraction ranges from $1/1,000$ up to $1/100,000$.

9. The method of claim 1, further comprising:
  obtaining the first fringe spectrum using the interferometer; and
  generating a sensor measurement based on the first measurement of the absolute optical path-length difference.

10. The method of claim 1, further comprising determining by a second processor a number of wavelengths and the wavelengths in the plurality of wavelengths based on, at least in part, a parameter of the first measurement of the absolute optical path-length difference, the parameter comprising at least one of a specified optical path-length difference upper limit and a specified resolution.

11. The method of claim 10, wherein the specified optical path-length difference upper limit ranges from 2 mm up to 10 mm and the specified resolution ranges from 10 pm up to 1 nm.

12. The method of claim 1, further comprising:
  designating the first measurement of the absolute optical path-length difference as the base estimate;
  updating, for at least one monitored wavelength, the term based on a phase shift estimate; and
  repeating the computing step (c) to obtain a refined first relative-phase measurement based on the at least one updated phase shift estimate; and
  repeating the computing step (e) to obtain a refined first measurement of the absolute optical path-length difference by aggregating the refined first relative-phase measurement, the fringe number, and the quadrant.

13. The method of claim 1, further comprising:
   (g) receiving in the memory a second fringe spectrum comprising a plurality of non-quadrature spaced light intensity samples, each sample corresponding to a different wavelength of light from the plurality of wavelengths, and the plurality of samples representing at least one full fringe cycle within the second fringe spectrum;
   (h) repeating steps (c) and (e) using the second fringe spectrum to obtain a second relative-phase measurement of the absolute optical path-length difference, wherein the base estimate of the absolute optical path-length difference comprises the first measurement; and
   (i) computing by the first processor a second measurement of the absolute optical path-length difference by aggregating the second relative-phase measurement, the fringe number, and the quadrant.

14. The method of claim 1, further comprising the step of using the first measurement to calculate a parameter of interest of a physical system.

15. The method of claim 14, wherein the parameter of interest is selected from the group consisting of salinity, pressure, temperature, strain, vibration, distance, refractive index of a medium, and changes thereof.

16. A system for measuring a parameter of interest using a measurement of absolute optical path-length difference, the system comprising:
   a receiver for receiving a first fringe spectrum from an interferometer comprising two optical paths having an absolute optical path-length difference therebetween that is to be measured, the first fringe spectrum comprising a plurality of non-quadrature spaced light intensity samples, each sample corresponding to a different wavelength of light from a plurality of wavelengths, and the plurality of samples representing at least one full fringe cycle within the first fringe spectrum;
   a coarse estimator configured for: (a) selecting a reference wavelength in the plurality of wavelengths: and (b) determining: (i) a base estimate of the absolute optical path-length difference, based on, at least in part, the first fringe spectrum, (ii) a fringe number and a quadrant based on, at least in part, the base estimate and the selected reference wavelength;
   a sampler in communication with the receiver for selecting a set of non-quadrature spaced samples from the plurality of samples;
   a relative-phase estimator for determining a relative-phase measurement of the absolute optical path-length difference using the selected non-quadrature spaced light-intensity samples, by expressing each light intensity sample as a combination comprising: (i) a term based on a relative phase $\phi$ that is based on a reference wavelength and is independent of the monitored wavelengths, and (ii) a term based on a phase shift estimate $\delta_i(L)$ relating to both the monitored wavelength corresponding to the light intensity sample and the base estimate of the absolute optical path-length difference; and
   an aggregator for deriving a measurement of the absolute optical path-length difference by aggregating the first relative-phase measurement, the fringe number, and the quadrant.

17. The system of claim 16, further comprising:
   a transducer that in response to an environmental condition alters at least one of a physical path and a refractive index of a path of radiation; and
   the interferometer coupled to the transducer for generating the first fringe spectrum based on, at least in part, radiation received through the path of radiation.

18. The system of claim 16, wherein:
   the aggregator is further configured to determine a measurement of a parameter of interest corresponding to the environmental condition using the measurement of the absolute optical path-length difference.

19. The system of claim 18, wherein the parameter of interest is selected from the group consisting of salinity, pressure, temperature, strain, vibration, distance, refractive index of a medium, and changes thereof.

20. The system of claim 16, wherein the interferometer comprises N detectors, N greater than 2, providing N non-quadrature spaced light intensity samples.

21. The system of claim 16, further comprising a radiation source adapted to emit at least N wavelengths of electromagnetic radiation, wherein N is greater than two.

* * * * *